United States Patent
Chbani et al.

(10) Patent No.: US 12,547,698 B2
(45) Date of Patent: Feb. 10, 2026

(54) HOST-DEVICE INTERFACE FOR DEBUG AUTHENTICATION

(71) Applicant: STMicroelectronics International N.V., Geneva (CH)

(72) Inventors: Xavier Chbani, Grenoble (FR); Nadia Van-Den-Bossche, Meylan (FR)

(73) Assignee: STMicroelectronics International N.V., Geneva (CH)

( * ) Notice: Subject to any disclaimer, the term of this patent is extended or adjusted under 35 U.S.C. 154(b) by 169 days.

(21) Appl. No.: 18/521,480

(22) Filed: Nov. 28, 2023

(65) Prior Publication Data
US 2024/0176864 A1 May 30, 2024

(30) Foreign Application Priority Data
Nov. 30, 2022 (FR) ........................................ 2212575

(51) Int. Cl.
*H04L 29/06* (2006.01)
*G06F 21/44* (2013.01)

(52) U.S. Cl.
CPC .................... *G06F 21/44* (2013.01)

(58) Field of Classification Search
CPC ..................................................... G06F 21/44
See application file for complete search history.

(56) References Cited

U.S. PATENT DOCUMENTS

| | | | |
|---|---|---|---|
| 2011/0066835 A1 | 3/2011 | Kothari et al. | |
| 2017/0139008 A1* | 5/2017 | Lim | G01R 31/3177 |
| 2019/0361073 A1 | 11/2019 | Trantham | |
| 2022/0317184 A1 | 10/2022 | Albesa et al. | |

FOREIGN PATENT DOCUMENTS

| | | | | |
|---|---|---|---|---|
| WO | WO-2020002441 A1 * | 1/2020 | | G06F 21/81 |
| WO | WO-2023030947 A1 * | 3/2023 | | G06F 21/575 |

OTHER PUBLICATIONS

INPI Search Report and Written Opinion for priority application, FR Appl. 2212575, report dated Aug. 12, 2023, 9 pgs.
NXP: UM11126 LPC55S6x User Manual, Rev. 1.3, May 10, 2019, 1148 pgs., See Debug Section, Chapter 51, 22 pgs.

* cited by examiner

*Primary Examiner* — Jason K Gee
(74) *Attorney, Agent, or Firm* — Crowe & Dunlevy LLC (57) ABSTRACT

An electronic device includes a debug port providing a communications interface for debugging purposes, a plurality of processing unit access ports, an authentication interface circuit configured to authenticate the external device, and a further access port coupled between the debug port and the authentication interface circuit. The further access port is configured to be in an open state in which communications are relayed between the debug port and the authentication interface circuit. The authentication interface circuit has registers including a status register capable of being read by the external device via the debug port and the further access port, the status register being configured to store an indication of the open or closed state of each of the processing unit access ports.

18 Claims, 3 Drawing Sheets

HOST-DEVICE INTERFACE FOR DEBUG AUTHENTICATION

PRIORITY CLAIM

This application claims the priority benefit of French Application for Patent No. 2212575, filed on Nov. 30, 2022, the content of which is hereby incorporated by reference in its entirety to the maximum extent allowable by law.

TECHNICAL FIELD

The present disclosure relates generally to the field of electronics devices such as micro-controllers, and, in particular, to an interface circuit and method permitting secure access to given functions of electronics devices, such as debugging functions.

BACKGROUND

Electronic devices such as micro-controllers or other types of integrated circuits often comprise memory, such as Flash memory, RAM (random access memory), and registers, that can store sensitive data. Furthermore, processing units, such as CPUs (Central Processing Units) of such electronic devices may manipulate sensitive data during processing. Sensitive data is any data that should be kept secret, and thus should not be accessible from outside the device. This sensitive data may for example comprise encryption keys, passwords, software codes, boot codes, or the like. Such electronic devices generally comprise mechanisms for protecting the data stored on or otherwise manipulated by the device. For example, data is stored to the memories at the time of manufacture of the device using one or more access ports, and these access ports are then closed to prevent further access to the memories or processing units during the lifetime of the device. Such access ports can also be used to prevent access to peripherals of the electronic device.

However, sometimes it is desirable that memories, processing units and/or peripherals of an electronic device are rendered accessible during the lifetime of the device, for example for debugging purposes. In particular, an analysis of the data stored in the memory and/or in registers of a CPU by a field application engineer can help identify sources of faulty behavior. However, there are technical and security challenges in implementing an interface permitting access ports to be opened in order to access the memory, processing units and/or peripheral devices during the lifetime of the device.

SUMMARY

According to one aspect, an electronic device includes: a debug port providing a communications interface for debugging purposes; a first processing unit; one or more processing unit access ports coupled to the debug port, wherein a first of the processing unit access ports is coupled between the debug port and the first processing unit, wherein each of the one or more processing unit access ports is configured to be in one of an open state in which the processing unit access port relays communications to and from the debug port and a closed state in which the processing unit access port blocks communications to and from the debug port; an authentication interface circuit configured to authenticate an external device; and a further access port coupled between the debug port and the authentication interface circuit, wherein the further access port is configured to be in an open state in which communications are relayed between the debug port and the authentication interface circuit; and wherein the authentication interface circuit includes registers having a status register read by the external device via the debug port and the further access port, wherein the status register is configured to store an indication of the open or closed state of each of the processing unit access ports.

According to one embodiment, the registers further include a host register configured to be read by the first processing unit and to be written to by the external device via the debug port and the further access port.

According to one embodiment, the registers further include a device register configured to be read by the external device via the debug port and the further access port and to be written to by the first processing unit.

According to one embodiment, the registers further include an acknowledge register configured to indicate when at least part of an electronic message is available to be read in the host register and when at least part of an electronic message is available to be read in the device register, wherein the acknowledge register is read-only for the first processing unit and for the external device.

According to one embodiment, the authentication interface circuit is configured: to detect when at least part of an electronic message has been written to the host register, and to set, in response, a host acknowledge bit in the acknowledge register; and to detect when the first processing unit reads the host register, and in response, to reset the host acknowledge bit in the acknowledge register.

According to one embodiment, the authentication interface circuit is configured: to detect when at least part of an electronic message has been written to the device register, and in response to set a device acknowledge bit in the acknowledge register; and to detect when the external device reads the device register, and in response to reset the device acknowledge bit in the acknowledge register.

According to one embodiment, the first processing unit is configured: to read from the host register an authentication request from the external device; to authenticate the external device; and to set at least one of the one or more processing unit access ports to an open state, thereby causing the indication of the state of the one or more processing unit access ports to be updated in the status register.

According to one embodiment, the first processing unit is configured to authenticate the external device by: storing an authentication challenge or password request to the device register; reading an authentication certificate or password from the host register; and verifying the certificate or password.

According to one embodiment, the electronic device further includes a monotonic counter, wherein the first processing unit is further configured to read from the certificate an indication of a count value from which debug functionality is authorized, and wherein the first processing unit is further configured to execute a boot sequence including the incrementation of the monotonic counter, wherein the debug functionality is authorized once the monotonic counter has reached said count value.

According to one embodiment, the processing unit access ports are each coupled to an associated processing unit.

According to one embodiment, the electronic device also includes: a peripheral interface; and a peripheral interface access port coupled between the debug port and the peripheral interface, wherein the peripheral interface access port is configured to be in one of an open state in which it relays communications to and from the debug port and a closed state in which it blocks communications to and from the debug port, wherein the status register is configured to store an indication of the open or closed state of the peripheral interface access port.

According to a further aspect, there is provided a method of initiating a debugging of the above electronic device, including: reading, by the external device via the debug port and the further access port, the state of each of the processing unit access ports stored by the status register; and initiating, by the external device, the debug of one or more of the processing units that is in the open state.

Another aspect of the present disclosure relates to a non-transitory computer-readable medium storing a program which, when executed by a processor or computing system in an external device, causes the external device to perform the method as defined above.

The non-transitory computer-readable medium may have features and advantages that are analogous to those set out below in relation to the related method and related device.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, the operations and elements that are useful for an understanding of the embodiments described herein have been illustrated and described in detail. For example, debugging techniques for electronic devices using an external debugger are well known in the art and have not been described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

The term "volatile memory" is used herein to designate a memory device in which data stored in the memory is conserved only when the device is powered, meaning that the data is lost upon power-down. In contrast, a "non-volatile memory" conserves its stored data even when the device is powered down.

Figure 1:
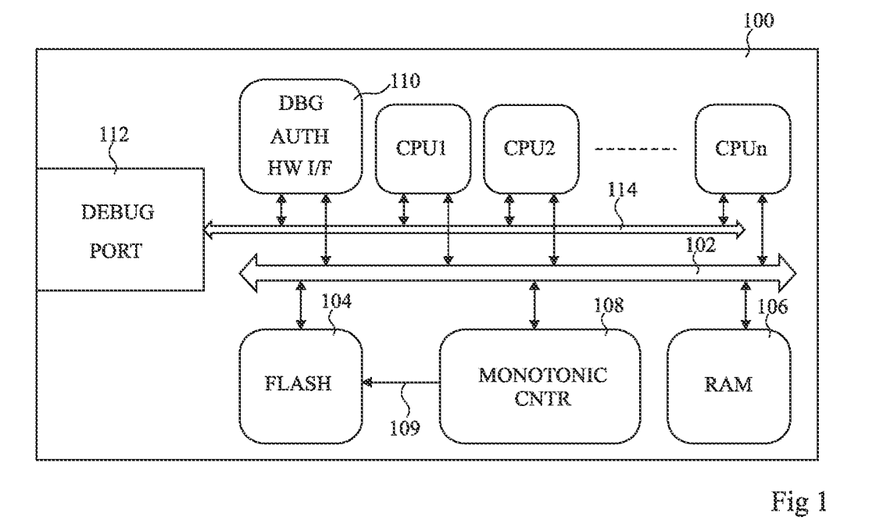
FIG. 1 schematically illustrates an electronic device.

FIG. 1 schematically illustrates an electronic device 100 according to an example embodiment. The electronic device 100 is for example an integrated circuit. In some embodiments, the electronic device is a micro-controller. The electronic device 100 for example comprises one or more processing units CPU1, CPU2, CPUn, such as central processing units (CPUs). For example, in some embodiments, the electronic device 100 comprises at least two processing units. One of the processing units of the electronic device 100 is for example designated as a master processing unit. In the example embodiments of the following description, the processing unit CPU1 is designated as the master processing unit, although in alternative embodiments another of the processing units could be the master.

The processing units CPU1 to CPUn are for example coupled to a system bus 102, which is further coupled to one or more memory circuits. The memory circuits may comprise one or more non-volatile memories and/or one or more volatile memories. In the example of FIG. 1, the memory circuits include a non-volatile memory 104 (FLASH), which is for example a Flash memory, and a volatile memory 106 (RAM), which is for example a random access memory. The one or more memory circuits 104, 106 may store for example software code including instructions that are executed by the one or more processing units in order implement the functionalities of the electronic device 100.

In some embodiments, the electronic device 100 further comprises a monotonic counter 108 (MONOTONIC CNTR). The monotonic counter 108 may be for example coupled to the bus 102.

Monotonic counters are known in the prior art, an example of such a counter being described in the publication "Virtual Monotonic Counters and Count-Limited Objects using a TPM without a Trusted OS" by L.F.G. Sarmenta, et al., incorporated by reference to the maximum extent permitted by the law. This paper describes embodiments of counters implemented by hardware and/or by software. The monotonic counter 108 is for example implemented by hardware in the form of a digital circuit, such as an Application Specific Integrated Circuit (ASIC). The monotonic counter 108 is configured to maintain a count value, accessible at an output 109 of the counter. In the example of FIG. 1, the monotonic counter 108 may be coupled to the non-volatile memory 104.

Following an increment instruction, for example generated by the master processing unit CPU1, the monotonic counter 108 is configured to irreversibly increase its count value by one or more units, but following each increment, the operation is not reversible. Indeed, the monotonic counter 108 is configured so that its count value may only increase and may never decrease. Moreover, between two increments, the count value is protected against any modification, so that it cannot be erased or changed. Only the increment instruction allows the current value to be replaced by a new value that is higher than the current value.

The monotonic counter 106 is configured such that no instruction, other than a resetting of the electronic device 100, will permit the counter to return to a previous count value once the increment instruction is executed. In the case where the count value is stored in a volatile manner, each time the electronic device 100 is powered down, the count value is lost and each time the device 100 is rebooted, the monotonic counter 108 for example generates an initial count value again. In the case where the count value is stored in a non-volatile memory, upon each reboot, a current count value stored in the non-volatile memory is for example over-written by the initial count value.

The electronic device 100 further comprises an authentication interface circuit 110 (DBG AUTH HW I/F), which is for example a hardware circuit coupled to the bus 102, and configured to permit an authentication of an external device (not illustrated in FIG. 1), which may be connected to the electronic device 100 for debugging purposes.

The electronic device 100 further comprises a debug port 112 (DEBUG PORT) providing a communications interface for debugging purposes. For example, the debug port 112 is a hardware circuit comprising data buffers and/or other circuitry for facilitating data communications between the electronic device 100 and an external device that is coupled to the debug port 112. For example, the debug port 112 comprises a wired communications interface configured to provide wired communications between the electronic device 100 and the external device, the wired communications interface for example comprising a socket for receiving a plug of a cable linking the device 100 to the external device. Alternatively, the debug port 112 comprises a wireless communications interface for providing wireless communications between the electronic device 100 and the external circuit.

The debug port 112 is for example coupled to the authentication interface circuit 110 and to each of the processing units CPU1 to CPUn via a dedicated bus 114, different to the system bus 102.

While not illustrated in FIG. 1, the electronic device 100 may further comprise one or more peripheral device interface circuits for interfacing with peripheral devices of the device 100. For example, such interface circuits are also coupled to the system bus 102, and are also accessible by the debug port 112 via the dedicated bus 114.

Figure 2:
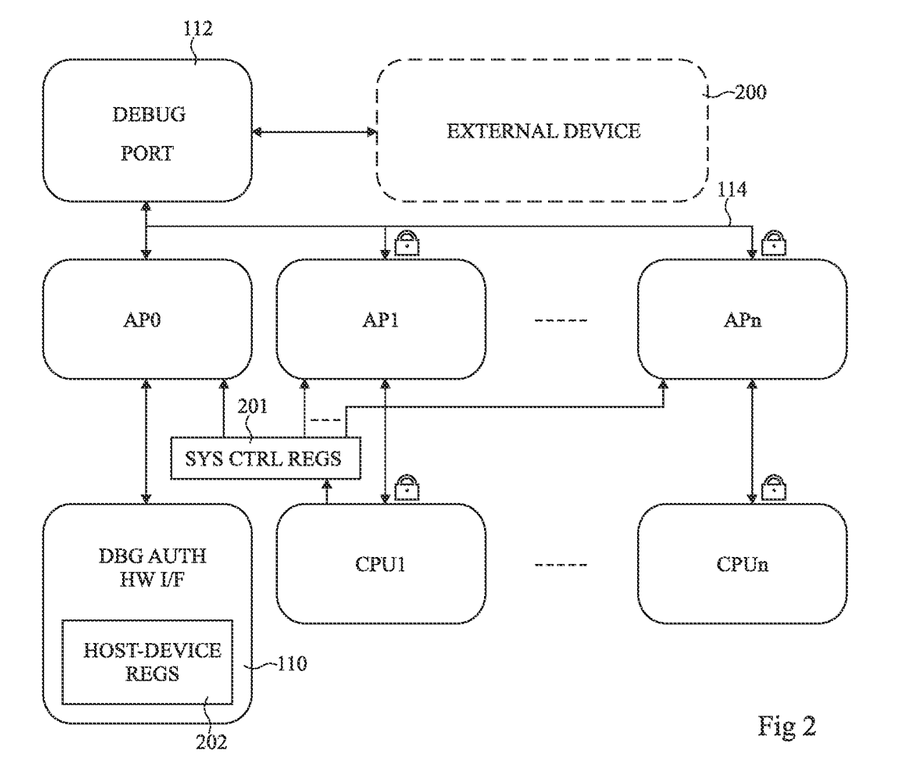
FIG. 2 schematically illustrates in more detail access ports of the electronic device of FIG. 1.

FIG. 2 schematically illustrates access ports AP0 to APn of the electronic device 100 of FIG. 1 according to an example embodiment of the present disclosure.

In particular, the debug port 112 is coupled to each of the processing units CPU1 to CPUn via, for example, the dedicated bus 114 and via corresponding access ports AP1 to APn. These access ports will also be referred to herein as processing unit access ports, and are each capable of being in open and closed states. Furthermore, in the case that the electronic device 100 comprises one or more peripheral device interface circuits, the debug port 112 is for example coupled to each interface circuit via the dedicated bus 114 and via a corresponding peripheral interface access port (not illustrated) similar to the access ports AP1 to APn. In the following, what is described in relation with the processing unit access ports applies similarly (e.g., mutatis mutandis), to the peripheral interface access ports.

When in the open state, each access port relays communications to and from the debug port 112. When in the closed state, the debug port blocks communications to and from the debug port 112.

Furthermore, the debug port 112 is for example coupled to the authentication interface circuit 110, for example via the dedicated bus 114 and via an access port AP0. The access port AP0 is for example configured to be always open during one or more states of the electronic device 100, as will now be defined. For example, the access port AP0 is open when the electronic device 100 is in a state according to which it is powered but prior to release of a reset state of the device, and during a booting state in the case that a debug authentication request has been made, as described in more detail below. In this open state, the access port AP0 is configured to relay communications between the debug port 112 and the authentication interface circuit 110.

Each of the access ports AP0 to APn is for example a hardware circuit comprising memory buffers and/or other circuitry for relaying communications, when in the open state, between the debug port and the circuit 110 or processing units CPU1 to CPUn. In the case of the processing unit access ports AP1 to APn, these are positioned between the debug port 112 and the processing units CPU1 to CPUn respectively, and provide the only available communications channel between the debug port 112 and the processing units CPU1 to CPUn. Thus, when these access ports AP1 to APn are in the closed state, no communications link is available between the debug port 112 and the processing units CPU1 to CPUn, and the processing units CPU1 to CPUn are thus protected from unauthorized access attempts via the debug port 112.

The access ports AP0 to APn are for example controlled to be in the open or closed state by control bits stored in a system control register 201, which is for example programmed by the master processing unit CPU1.

As illustrated in FIG. 2, an external device 200 (EXTERNAL DEVICE) is for example connected to the debug port 112 when a debugging procedure is to be initiated. The external device 200 is for example a computer executing a debugger, which is a software program for use in debugging the electronic device 100.

The authentication interface circuit 110 for example comprises registers 202 (HOST-DEVICE REGS) allowing communications between the external device 200 (host) and the master processing unit CPU1, as will now be described in more detail with reference to FIG. 3.

Figure 3:
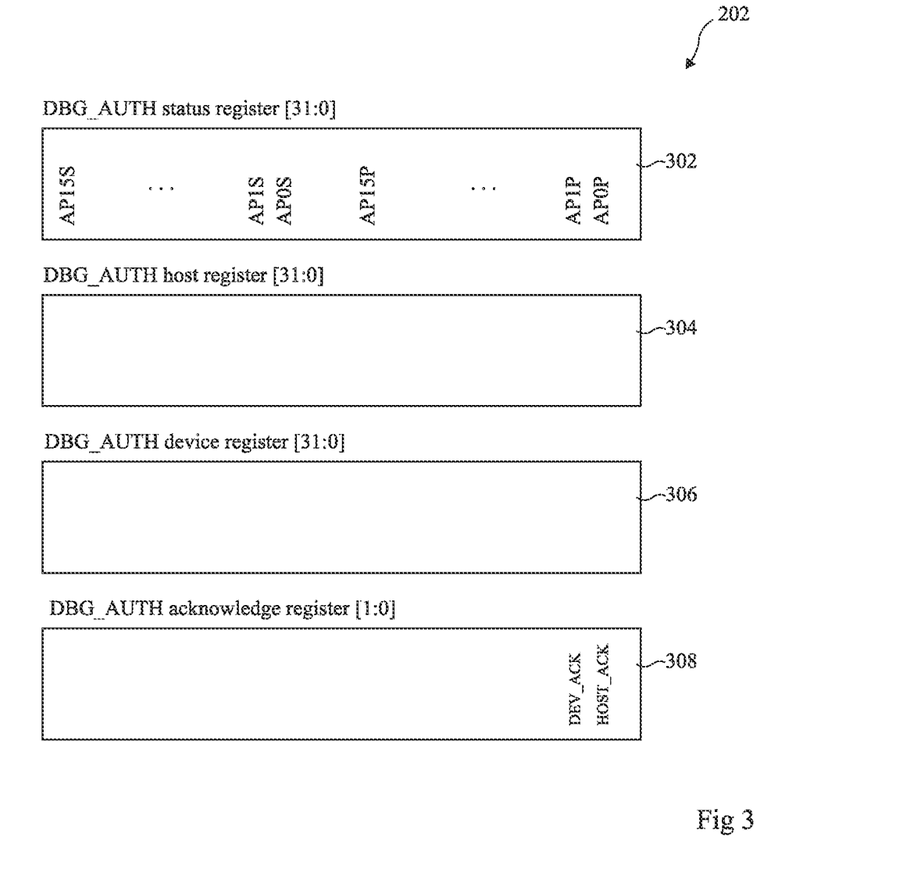
FIG. 3 schematically illustrates registers of an authentication interface circuit of the communications interface of FIG. 2.

FIG. 3 schematically illustrates the host-device registers 202 of the authentication interface circuit 110 of FIG. 2 in more detail according to an example embodiment of the present disclosure.

The registers 202 are for example volatile registers.

The registers 202 for example comprise a status register (DBG_AUTH status register [31:0]) 302, which is configured to store an indication of the open or closed state of each of the access ports of the device, such as the processing unit access ports AP1 to APn, and the one or more peripheral interface access ports, if present. The status register 302 is capable of being read by the external device 200 via the debug port 112 and via the access port AP0. In some embodiments, the status register 302 is read-only. In the example of FIG. 3, the status register 302 is a 32-bit register, although in alternative embodiments other sizes would be possible. Furthermore, in the example embodiment of FIG. 3, the status register 302 is capable of indicating the status of up to 16 access ports AP0 to AP15, although in alternative embodiments more or fewer access ports could be supported, depending on the size of the status register 302. In the example of FIG. 3, the status register 302 stores, for each access port, a first bit AP0P to AP15P indicating whether the corresponding access port AP0 to AP15 is present, and a second bit AP0S to AP15S indicating the current status of the corresponding access port AP0 to AP15, in other words whether it is open or closed.

Upon power-up of the electronic device 100, the contents of the status register 302 is for example loaded, by a state machine (not illustrated), from secure storage in a non-volatile memory, such as the memory 104 of FIG. 1. For example, by default, upon power-up, the access ports AP1 to APn are all set to be closed, whereas the access port AP0 is set to be open. The open or closed status to each of the access ports AP0 to APn is for example controlled directly by stored states of the electronic device 100 that are stored in secure storage.

An advantage of the status register is that it provides a scalable solution capable of supporting the addition of further access ports to the system.

In some embodiments, the registers 202 further include a host register 304 (DBG_AUTH host register [31:0]) permitting the external device 200, acting as host, to write to the electronics device 100, for example to the master processing unit CPU1. Thus, the host register 304 is for example capable of being written to and read by the external device 200, and of being read by the electronic device 100, for example by master processing unit CPU1. In the example of FIG. 3, host register 304 is a 32-bit register, although in alternative embodiments other sizes would be possible.

In some embodiments, the registers 202 further include a device register 306 (DBG_AUTH device register [31:0]) permitting the electronics device 100, for example the master processing unit CPU1, to write to the external device 200. Thus, the device register 306 is for example capable of being read by the external device 200 via the debug port 112 and the access port AP0, and of being written to and read by the electronic device 100, for example by master processing unit CPU1. In the example of FIG. 3, device register 306 is a 32-bit register, although in alternative embodiments other sizes would be possible.

The host and device registers 304, 306 are for example configured to play a role of a single-word receiving/transmitting deep FIFO (first-in, first-out) buffer. In particular, a data message that is bigger than the size of either register can for example be transmitted via the registers 304, 306 one word at a time, and read one word at a time, until the whole message has been communicated.

In some embodiments, the registers 202 further include an acknowledge register 308 (DBG_AUTH acknowledge register [1:0]) for indicating when at least part of an electronic message is available to be read in the host register 304 and when at least part of an electronic message is available to be read in the device register 306.

The acknowledge register 308 is for example read-only for the processing unit CPU1 and for the external device 200. In some embodiments, the acknowledge register 308 stores a host acknowledge bit HOST ACK and a device acknowledge bit DEV_ACK.

For example, the authentication interface circuit 110 is configured to detect when at least part of an electronic message has been written to the host register 304, and to set, in response, the host acknowledge bit HOST_ACK in the acknowledge register 308. The master processing unit is for example configured to poll the host acknowledgement bit HOST_ACK, and to read the host register 304 in response to the host acknowledgement bit HOST_ACK being set. The authentication interface circuit 110 is for example further configured to detect when the electronic device, for example the master processing unit CPU1, reads the host register 304, and in response, to reset the host acknowledge bit HOST_ACK in the acknowledge register 308.

For example, the authentication interface circuit 110 is further configured to detect when at least part of an electronic message has been written to the device register 306, and to set, in response, the device acknowledge bit DEV_ACK in the acknowledge register 308. The external device 200 is for example configured to poll the device acknowledgement bit DEV_ACK, and to read the at least one device register 306 in response to the device acknowledgement bit DEV_ACK being set. The authentication interface circuit 110 is for example further configured to detect when the external device reads the electronic message from the device register 306, and in response, to reset the device acknowledge bit DEV_ACK in the acknowledge register 308.

A technical advantage of the dedicated acknowledge register 308 is that it leads to improved communication bandwidth between the external device 200 and the master processing unit CPU1 because data messages or frames can flow in both directions in parallel. A technical effect of the acknowledgement register being read-only is that this increases security.

Furthermore, a technical advantage of providing both a device register and a host register is that they accelerate the debug authentication process, as it is not necessary for the device or host to wait for a read acknowledgement prior to transmitting in the other direction.

Figure 4:
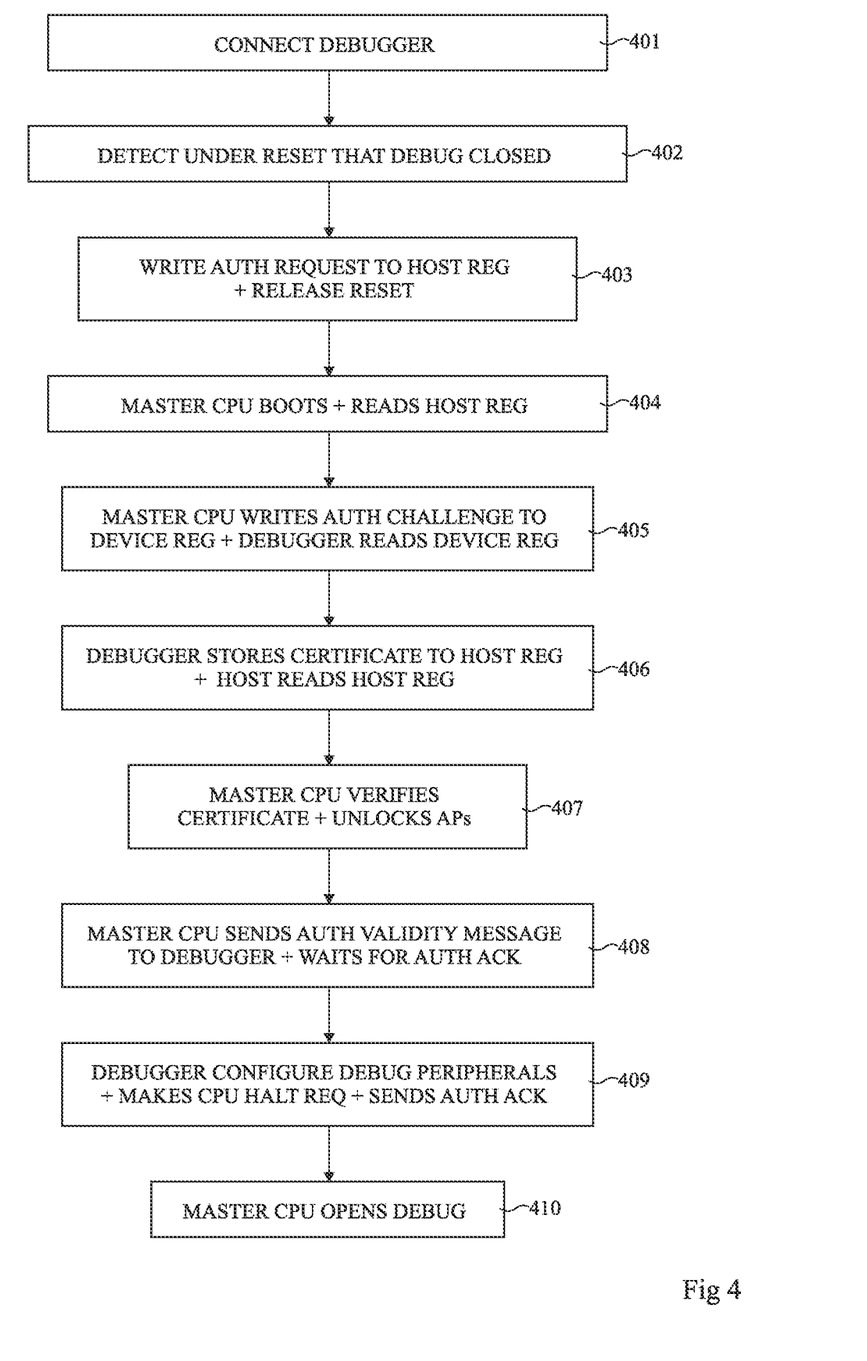
FIG. 4 is a flow diagram illustrating operations in a method of accessing an electronic device for debugging purposes using an external device.

FIG. 4 is a flow diagram illustrating operations in a method of accessing the electronic device 100 for debugging purposes using the external device 200 according to an example embodiment of the present disclosure.

In an operation 401 (CONNECT DEBUGGER), the external device 200 is for example connected to the debug port 112 of the electronic device 100, for example via a wired or wireless link.

In an operation 402 (DETECT UNDER RESET THAT DEBUG CLOSED), the external device 200, under control of the debugger, is for example configured to detect that the debug function of the electronic device 100 is closed, for example by reading the status register 302 and determining that one or more of the access ports AP1 to APn via which debugging is to be performed are closed. For example, this operation is performed while the external device 200 applies a reset command to the electronic device 100, for example via a reset pin of the electronic device 100.

In an operation 403 (WRITE AUTH REQUEST TO HOST REG+RELEASE RESET), the external circuit 200, under control of the debugger, is for example configured to write an authentication request to the host register 304, and then to release the reset of the electronic device 100. In response, the authentication interface circuit 110 is for example configured to set the ACK_HOST bit in the acknowledge register 308.

In an operation 404 (MASTER CPU BOOTS+READS HOST REG), the master processing unit CPU1 is for example configured to boot, and to read the authentication request in the host register 304, for example after having detected that the ACK_HOST bit in the acknowledge register 308 is set. This for example causes the master processing unit to maintain the open state of the access port AP0 during boot. In response, the authentication interface circuit 110 is for example configured to reset the ACK_HOST bit in the acknowledge register 308.

In an operation 405 (MASTER CPU WRITES AUTH CHALLENGE TO DEVICE REG AND DEVICE REG READ BY DEBUGGER), the master processing unit CPU1 is for example configured to write an authentication challenge to the device register 306. In response, the authentication interface circuit 110 is for example configured to set the ACK_DEV bit in the acknowledge register 308. The external device 200, under control of the debugger, is then for example configured to read the authentication challenge in the device register 306, for example after having detected that the ACK_DEV bit in the acknowledge register 308 is set. In response, the authentication interface circuit 110 is for example configured to reset the ACK_DEV bit in the acknowledge register 308. Of course, if the size of the challenge exceeds the size of the device register 306, it is for example communicated by the master processing unit to the external circuit 200 over several write/read cycles until it has been entirely sent.

In an operation 406 (DEBUGGER STORES CERTIFICATE TO HOST REG), the external circuit 200, under control of the debugger, is for example configured to generate an authentication certificate based on the challenge, and to store the certificate to the host register 304. In response, the authentication interface circuit 110 is for example configured to set the ACK_HOST bit in the acknowledge register 308. The master processing unit CPU1 is then for example configured to read the host register 304, for example after having detected that the ACK_HOST bit in the acknowledge register 308 is set. In response, the authentication interface circuit 110 is for example configured to reset the ACK_HOST bit in the acknowledge register 308. Of course, if the size of the certificate exceeds the size of the host register 306, it is for example communicated by the external device 200 to the master processing unit CPU1 over several write/read cycles until it has been entirely sent.

In an operation 407 (MASTER CPU VERIFIES CERTIFICATE+UNLOCKS APs), the master processing unit CPU1 is for example configured to verify the certificate, and if validated, to unlock, and thus set to open status, one or more of the processing unit access ports AP1 to APn based on the credentials indicated by the certificate. In other words, debug is opened for all or for selected processing unit access ports AP1 to APN. For example, this is done by writing, by the master processing unit CPU1, to the one or more system control registers 201 of FIG. 2. For example, each processing device access port has its own dedicated control bits in the system control registers 201.

In some embodiments, the credentials indicated in the certificate also indicate a debug level that is permitted, for example indicating whether all of the firmware can be debugged, or only the non-secure firmware.

Furthermore, in some embodiments, the master processing unit CPU1 is configured to set, based on the credentials indicated by the certificate, a count value of the monotonic counter 108 of FIG. 1 from which debug functionality is authorized. This count value is for example stored as a parameter in the non-volatile memory 104. Then, when the master processing unit CPU1 is next configured to execute a boot sequence involving the incrementation of the monotonic counter 108, the debug functionality is authorized once the monotonic counter has reached the determined count value. For example, the boot sequence comprises two or more stages, each associated with corresponding software code, which is executed in sequence. The software code for each stage is associated with a corresponding count value, meaning that once this count value has been exceeded by the monotonic counter 108, the non-volatile memory 104 is configured to no longer permit access to the code. The use of a monotonic counter 108 for controlling secure debug during a boot sequence is for example described in more detail in the European patent application EP04068134, the content of which is hereby incorporated by reference to the maximum extent permitted by the law.

In the case that, in operation 407, the verification by the master processing unit CPU1 of the certificate fails, for example because the certificate is false, the master processing unit is for example configured to maintain the processing unit access ports AP1 to APn in the closed state, and, for example, to inform the external device via the device register 306.

In an operation 408 (MASTER CPU SENDS AUTH VALIDITY MESSAGE TO DEBUGGER+WAITS FOR AUTH ACK), the master processing unit CPU1 for example stores to the device register 306 an authorization validity message, which is read by the external device 200, under control of the debugger. The master processing unit CPU1 then for example waits for an acknowledgement from the external device 200.

In an operation 409 (DEBUGGER CONFIGURE DEBUG PERIPHERALS+MAKES CPU HALT REQ+SENDS AUTH ACK) the external device 200, under control of the debugger, for example configures the debug peripherals via the access ports, and then makes a CPU halt request, for example to the master processing unit and/or to another of the processing units. For example, with the access port AP1 in the open state, the system control registers 201 of FIG. 2 associated with the master processing unit are accessible, such that the debugger can make the CPU halt request via these registers. For example, this halt request will only be permitted by the master processing unit CPU1 if it corresponds to a boot stage corresponding to a count value of the monotonic counter equal to or greater than the authorized count value. The external device 200, under control of the debugger, also for example sends an authentication acknowledgement to the master processing unit CPU1 via the host register 304.

In an operation 410 (MASTER CPU OPENS DEBUG), the master processing unit CPU1 is for example configured to fully open the debug of the processing unit access ports covered by the certificate, for example by writing to the system control registers 201 of FIG. 2, when the appropriate boot execution stage is reached. For example, fully opening the debug means that the debugger of the external device 200 is able to access the system control registers of the associated processing unit, such as the registers 201 in the case of the master processing unit.

In some embodiments, a method of initiating a debugging of the electronic device 100 of FIG. 1 comprises, after coupling the external device 200 to the debug port 112, reading, by the external device 200 via the debug port 112 and the further access port AP0, the state of each of the processing unit access ports AP0 to APn stored by the status register 302; and initiating, by the external device, the debug of one or more of the processing units that is in the open state.

An advantage of embodiments described herein is that they provide the technical effect of allowing an external device, such as a computer, running a debugger, to communicate in a secure manner with an electronic device in order to identify a debug status of the electronic device, and in some cases to obtain a unique identifier of the electronic device 100, which is for example stored in non-volatile memory such as in the memory 104, and/or to issue credentials for debug re-opening on the electronic device.

Various embodiments and variants have been described. Those skilled in the art will understand that certain features of these embodiments can be combined, and other variants will readily occur to those skilled in the art. For example, it will be apparent to those skilled in the art that in some embodiments, only one or some of the registers 302, 304, 306 and 308 of FIG. 3 may be present in the authentication interface circuit 110. Furthermore, while embodiments have been described in which authentication is based on a challenge and a response certificate, in alternative embodiments, rather than a challenge, a password request is set by the master processing unit to the external device, and the external device replies with a password rather than a certificate, the password then being verified by the master processing unit.

Finally, the practical implementation of the embodiments and variants described herein is within the capabilities of those skilled in the art based on the functional description provided hereinabove.

The invention claimed is:

1. An electronic device, comprising:
a debug port providing a communications interface for debugging purposes;
a first processing unit;
a plurality of processing unit access ports coupled to the debug port, a first processing unit access port of the plurality of processing unit access ports being coupled between the debug port and the first processing unit, each of the plurality of processing unit access ports being configured to be in one of an open state in which it relays communications to and from the debug port and a closed state in which it blocks communications to and from the debug port;
an authentication interface circuit configured to authenticate an external device; and
a further access port coupled between the debug port and the authentication interface circuit, the further access port being configured to be in an open state in which communications are relayed between the debug port and the authentication interface circuit, the authentication interface circuit comprising registers including a status register configured to be readable by the external device via the debug port and the further access port, the status register being further configured to store an indication of the open or closed state of each of the plurality of processing unit access ports.

2. The electronic device of claim 1, wherein the registers further include a host register configured to be readable by the first processing unit and to be writeable to by the external device via the debug port and the further access port.

3. The electronic device of claim 1, wherein the registers further include a device register configured to be readable by the external device via the debug port and the further access port and to be writeable to by the first processing unit.

4. The electronic device of claim 3, wherein the registers further include:
a host register configured to be readable by the first processing unit and to be writeable to by the external device via the debug port and the further access port; and
an acknowledge register configured to indicate when at least part of an electronic message is available to be read in the host register and when at least part of an electronic message is available to be read in the device register.

5. The electronic device of claim 4, wherein the acknowledge register is configured to be read-only for the first processing unit and for the external device.

6. The electronic device of claim 4, wherein the authentication interface circuit is configured to:
detect when at least part of an electronic message has been written to the host register, and in response thereto to set a host acknowledge bit in the acknowledge register; and
detect when the first processing unit reads the host register, and in response thereto reset the host acknowledge bit in the acknowledge register.

7. The electronic device of claim 4, wherein the authentication interface circuit is configured to:
detect when at least part of an electronic message has been written to the device register, and in response thereto set a device acknowledge bit in the acknowledge register; and
detect when the external device reads the device register, and in response thereto reset the device acknowledge bit in the acknowledge register.

8. The electronic device of claim 4, wherein the first processing unit is configured to:
read from the host register an authentication request from the external device;
authenticate the external device; and
set at least one of the plurality of processing unit access ports to an open state, thereby causing the indication of a state of the plurality of processing unit access ports to be updated in the status register.

9. The electronic device of claim 8, wherein the registers further include:
a host register configured to be readable by the first processing unit and to be writeable to by the external device via the debug port and the further access port; and
a device register configured to be readable by the external device via the debug port and the further access port and to be writeable to by the first processing unit;
wherein the first processing unit is configured to authenticate the external device by:
storing an authentication challenge or password request to the device register;
reading an authentication certificate or password from the host register; and
verifying the authentication certificate or password.

10. The electronic device of claim 9, further comprising a monotonic counter, wherein the first processing unit is further configured to read from the authentication certificate an indication of a count value from which debug functionality is authorized, and to execute a boot sequence comprising an incrementation of the monotonic counter, the debug functionality being authorized once the monotonic counter has reached said count value.

11. The electronic device of claim 1, wherein each processing unit access port of the plurality of processing unit access ports is coupled to an associated processing unit.

12. The electronic device of claim 1, further comprising:
a peripheral interface; and
a peripheral interface access port coupled between the debug port and the peripheral interface, the peripheral interface access port being configured to be in one of an open state in which it relays communications to and from the debug port and a closed state in which it blocks communications to and from the debug port, wherein the status register is configured to store an indication of the open or closed state of the peripheral interface access port.

13. A method for managing communications in an electronic device, the method comprising:
providing a communications interface for debugging purposes via a debug port;
coupling a first processing unit to the debug port via a first processing unit access port of a plurality of processing unit access ports;
selectively setting each of the plurality of processing unit access ports to one of:
an open state wherein communications to and from the debug port are relayed; and a closed state wherein communications to and from the debug port are blocked;

authenticating an external device using an authentication interface circuit;

coupling the debug port to the authentication interface circuit via a further access port, wherein in an open state communications are relayed between the debug port and the authentication interface circuit;

reading, by the external device, a status register in the authentication interface circuit via the debug port and the further access port;

storing, in the status register, an indication of the open or closed state of each of the plurality of processing unit access ports;

reading, by the external device via the debug port and the further access port, states of each of the plurality of processing unit access ports stored by the status register; and initiating, by the external device, the debug of one or more of the plurality of processing unit access ports that is in the open state.

14. The method of claim 13, further comprising:

reading, by the external device via the debug port and the further access port, a device register in the authentication interface circuit; and writing, by the first processing unit, to the device register.

15. The method of claim 14, further comprising:

reading, by the first processing unit, a host register in the authentication interface circuit;

writing, by the external device via the debug port and the further access port, to the host register; and indicating, via an acknowledge register, availability of an electronic message in the host register and the device register.

16. The method of claim 15, wherein the acknowledge register is accessed in a read-only mode by the first processing unit and the external device.

17. The method of claim 15, further comprising:

detecting, by the authentication interface circuit, a written electronic message in the host register;

setting a host acknowledge bit in the acknowledge register; and resetting the host acknowledge bit upon the host register being read by the first processing unit or the external device.

18. The method of claim 15, further comprising:

reading, by the first processing unit, an authentication request from the host register;

authenticating the external device;

setting at least one of the plurality of processing unit access ports to an open state, thereby updating the indication of a state of the plurality of processing unit access ports in the status register;

storing, by the first processing unit, an authentication challenge or password request in the device register;

reading an authentication certificate or password from the host register;

verifying the authentication certificate or password;

reading, by the first processing unit, a count value from an authentication certificate from which debug functionality is authorized; and executing a boot sequence that includes incrementing a monotonic counter, where the debug functionality is authorized once the monotonic counter reaches the count value.

* * * * *